(12) United States Patent
Takeko et al.

(10) Patent No.: US 7,695,782 B2
(45) Date of Patent: Apr. 13, 2010

(54) OPTICAL LAMINATE

(75) Inventors: Ryu Takeko, Ashiya (JP); Akira Kawamura, Izumisano (JP); Atsushi Higo, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 106 days.

(21) Appl. No.: 11/225,179

(22) Filed: Sep. 14, 2005

(65) Prior Publication Data
US 2006/0062938 A1 Mar. 23, 2006

(30) Foreign Application Priority Data
Sep. 17, 2004 (JP) ............... 2004-271525
Sep. 17, 2004 (JP) ............... 2004-271526

(51) Int. Cl.
*G02F 1/1335* (2006.01)

(52) U.S. Cl. ............... 428/1.5; 428/1.3; 349/122; 349/137; 156/60

(58) Field of Classification Search .......... 428/1.1, 428/1.5–1.55, 343, 354, 355 R, 355 CN, 428/355 AC, 1.3, 1.31; 156/60; 349/96, 349/122, 137
See application file for complete search history.

(56) References Cited

U.S. PATENT DOCUMENTS

| | | | | |
|---|---|---|---|---|
| 5,827,609 | A * | 10/1998 | Ercillo et al. ............... | 428/354 |
| 6,021,564 | A * | 2/2000 | Hanson ............... | 29/852 |
| 6,183,862 | B1 * | 2/2001 | Ko et al. ............... | 428/354 |
| 6,396,451 | B1 * | 5/2002 | Wu et al. ............... | 343/756 |
| 6,432,498 | B1 * | 8/2002 | Ohtaki et al. ............... | 428/40.1 |
| 7,208,206 | B2 * | 4/2007 | Hieda et al. ............... | 428/1.5 |
| 2002/0035177 | A1 * | 3/2002 | Kishioka et al. ............... | 524/157 |
| 2002/0038582 | A1 * | 4/2002 | Holl ............... | 75/230 |
| 2002/0114947 | A1 * | 8/2002 | Tanabe et al. ............... | 428/343 |
| 2003/0068491 | A1 * | 4/2003 | Otaki et al. ............... | 428/343 |
| 2003/0151705 | A1 * | 8/2003 | Saiki et al. ............... | 349/96 |

(Continued)

FOREIGN PATENT DOCUMENTS

JP 2000-109771 A 4/2000

(Continued)

OTHER PUBLICATIONS

Akzo Nobel, Cellulosic Specialties, Dynamic Properties, downloaded from internet website: <http://www.cs.akzonobel.com/NR/rdonlyres/E163F416-309D-49DE-ACAC-D69DC9174DE6/9246/Dynamicpropertiessept04.ppt> on Jan. 26, 2009.*

*Primary Examiner*—Sophie Hon
(74) *Attorney, Agent, or Firm*—Birch, Stewart, Kolasch & Birch, LLP.

(57) ABSTRACT

An optical laminate comprising an anti-reflection film 1, polarizing film 2, adhesive layer 3, glass cell for liquid crystal display 4, adhesive layer 5 and polarizing film 6 laminated sequentially, wherein the ratio (B/A) of the maximum value B of the loss tangent of the adhesive layer 5 to the maximum value A of the loss tangent of the adhesive layer 3 is 1.1 or more. The maximum value of the loss tangent means the maximum value of loss modulus (E") storage modulus (E') (=tan δ), each measured by heating the adhesive layer in a temperature range of −70° C. to 200° C. at a temperature rising rate of 4° C./min and a frequency of 1 Hz.

15 Claims, 2 Drawing Sheets

U.S. PATENT DOCUMENTS

| | | | |
|---|---|---|---|
| 2004/0063804 A1* | 4/2004 | Takeda et al. | 522/122 |
| 2004/0092689 A1 | 5/2004 | Yamamoto | |
| 2004/0152812 A1 | 8/2004 | Yamamoto | |
| 2005/0065252 A1 | 3/2005 | Kawamura | |
| 2006/0108050 A1* | 5/2006 | Satake et al. | 156/101 |

FOREIGN PATENT DOCUMENTS

| | | |
|---|---|---|
| JP | 2004-2782 A | 1/2004 |
| WO | WO 2004038464 A1 * | 5/2004 |

* cited by examiner

OPTICAL LAMINATE

BACKGROUND OF THE INVENTION

1. Technical Field of the Invention

The present invention relates to an optical laminate.

2. Description of the Related Art

Liquid crystal cells generally used in liquid crystal displays such as a TN liquid crystal cell (TFT), a STN liquid crystal cell (STN) and the like, have a structure in which a liquid crystal component is sandwiched between two glass base materials. On the surface of the glass base material, an optical film such as a polarizing film, phase retardation film and the like is laminated via an adhesive composed mainly of an acrylic resin.

An optical laminate composed of an anti-reflection film 1, polarizing film 2, adhesive layer 3, glass cell for liquid crystal display 4, adhesive layer 5 and polarizing film 6 laminated in this order is in general used.

Adhesive layers 3 and 5 used in such an optical laminate tend to generate curl and the like due to large dimension change by expansion and shrinkage under heating or moistening and heating conditions, consequently, there are problems such as occurrence of foaming in an adhesive layer of the resulted optical laminate, generation of peeling between an adhesive layer and a glass base material, and the like. Under heating or moistening and heating conditions, distribution of remaining stress acting on an optical film such as an anti-reflection film 1, polarizing film 2 and the like becomes non-uniform, concentration of stress occurs around peripheral parts of an optical laminate, consequently, there is a problem that light leakage occurs in a TN liquid crystal cell (TFT).

Further, recently, such a liquid display is used for vehicle-mounted applications such as a car navigation system and the like, however, in vehicle-mounted applications, durability such as no occurrence of appearance change such as foaming, floating, peeling, fogging and the like is also being required.

To solve such problems, there is a suggestion on an adhesive essentially consisting of an acrylic resin composition composed of a high molecular weight acrylic resin having a weight-average molecular weight of 900,000 to 2,500,000, a Tg of −45° C. or lower and a SP value of 8.7 to 9.3 and a low molecular weight acrylic resin having a weight-average molecular weight of 50000 to 200000, a Tg of −40 to 0° C. and a SP value of 8.7 to 9.3 (Japanese Patent Application Laid-Open (JP-A) No. 2004-2782 [claim 1], [0129]).

However, when an optical laminate having a constitution of anti-reflection film/polarizing film/adhesive layer/glass base material/adhesive layer/polarizing film is produced using the adhesive on both surfaces of the glass base material and one cycle of 60° C.→−20° C.→60° C. is repeated 100 times, then, peeling, hazing and the like occur on the surface of a glass plate, durability thereof is not sufficient, and light leakage occurs, in some case.

DISCLOSURE OF THE INVENTION

An object of the present invention is to provide an optical laminate having suppressed light leakage and excellent in durability.

The present inventors have intensively studied to find an optical laminate capable of solving the problem as described above, and resultantly found that an optical laminate obtained by using different adhesives as the adhesive to be pasted on both surfaces of a glass cell for liquid crystal display shows suppressed light leakage and is excellent in durability, and completed the present invention.

Namely, the present invention provides the following [1] to [16].

[1] An optical laminate comprising an anti-reflection film 1, polarizing film 2, adhesive layer 3, glass cell for liquid crystal display 4, adhesive layer 5 and polarizing film 6 laminated sequentially, wherein the ratio (B/A) of the maximum value B of the loss tangent of the adhesive layer 5 to the maximmn value A of the loss tangent of the adhesive layer 3 is 1.1 or more.

The maximum value of the loss tangent means the maximum value of loss modulus (E")/storage modulus (E') (=tan δ), each measured by heating the adhesive layer in a temperature range of −70° C. to 200° C. at a temperature rising rate of 4° C./min and a frequency of 1 Hz.

[2] The optical laminate according to [1], wherein the maximum value A of the loss tangent of the adhesive layer 3 is 0.85 to 1.46 and the maximum value B of the loss tangent of the adhesive layer 5 is 1.30 to 1.85.

[3] The optical laminate according to [1] or [2], wherein (gel fraction of adhesive layer 3)/(gel fraction of adhesive layer 5) is 1.1 or more.

[4] The optical laminate according to any of [1] to [3], wherein the gel fraction of the adhesive layer 3 is 40 to 95% and the gel fraction of the adhesive layer 5 is 5 to 55%.

[5] The optical laminate according to any of [1] to [4], wherein the adhesive layer 3 and the adhesive layer 5 are an adhesive layer formed by hardening an adhesive obtained by compounding a cross-linking agent in an acrylic resin and/or acrylic resin composition.

[6] The optical laminate according to any of [1] to [5], wherein the adhesive used in the adhesive layer 3 and the adhesive layer 5 is an adhesive comprising an acrylic resin containing a structural unit derived from an alkyl (meth)acrylate as a main component and a structural unit derived from (meth)acrylic acids having a polar functional group.

[7] The optical laminate according to [6], wherein the polar functional group is at least one functional group selected from the group consisting of a hydroxyl group, amino group, free carboxyl group and heterocyclic group.

[8] The optical laminate according to any of [1] to [7], wherein the adhesive used in the adhesive layer 3 and the adhesive layer 5 is an adhesive containing the following acrylic resins (1) and (2);

Acrylic resin (1): acrylic resin containing a structural unit derived from an alkyl (meth)acrylate as a main component and having a weight-average molecular weight of 50,000 to 500,000, Acrylic resin (2): acrylic resin containing a structural unit derived from an alkyl (meth)acrylate as a main component and a structural unit derived from (meth)acrylic acids having a polar functional group such as a hydroxyl group, amino group, free carboxyl group, heterocyclic group or the like, and having a weight-average molecular weight of 1,000,000 to 1,500,000.

[9] The optical laminate according to any of [1] to [8], wherein the adhesive used in the adhesive layer 3 and the adhesive layer 5 is an adhesive further containing a silane-based compound.

[10] The optical laminate according to any of [5] to [9], wherein the cross-linking agent is an isocyanate-based compound.

[11] The optical laminate according to any of [1] to [10], further containing at least one phase retardation film.

[12] The optical laminate according to any of [1] to [11], wherein a luminance improving film 7 is further laminated on a surface of the polarizing film 6 which is different from the surface pasted on the adhesive layer 5.

[13] An optical laminate obtained by peeling the anti-reflection film, polarizing films and adhesive layers from the optical laminate according to any of [1] to [11], then, sequentially laminating the polarizing film 2, adhesive layer 3, glass cell for liquid crystal display 4 obtained by peeling, adhesive layer 5 and polarizing film 6.

[14] A liquid crystal display comprising the optical laminate according to any of [1] to [13].

[15] A method for producing an optical laminate, comprising sequentially laminating an anti-reflection film 1, polarizing film 2, adhesive layer 3, glass cell for liquid crystal display 4, adhesive layer 5 and polarizing film 6, wherein the ratio (B/A) of the maximum value B of the loss tangent of the adhesive layer 5 to the maximum value A of the loss tangent of the adhesive layer 3 is 1.1 or more.

The maximum value of the loss tangent means the maximum value of loss modulus (E")/storage modulus (E') (=tan δ), each measured by heating the adhesive layer in a temperature range of −70° C. to 200° C. at a temperature rising rate of 4° C./min and a frequency of 1 Hz.

[16] The production method according to [15], wherein (gel fraction of adhesive layer 3)/(gel fraction of adhesive layer 5) is 1.1 or more.

Figure 1:
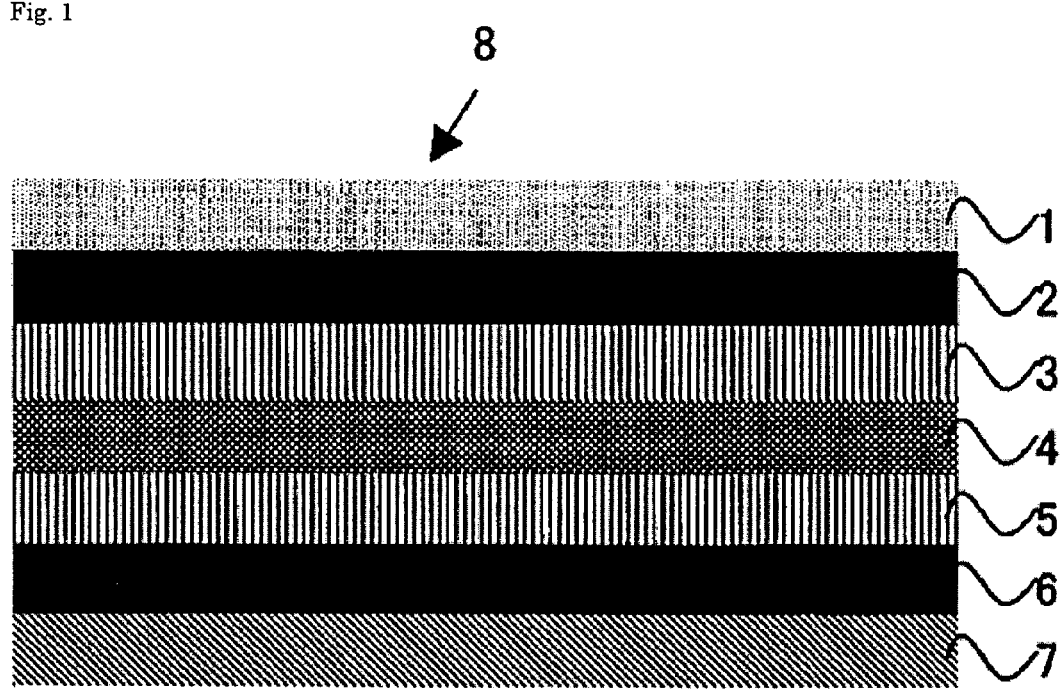
FIG. 1 is a sectional view of an optical laminate containing a brightness enhancement film, one embodiment of the present invention.
Figure 2:
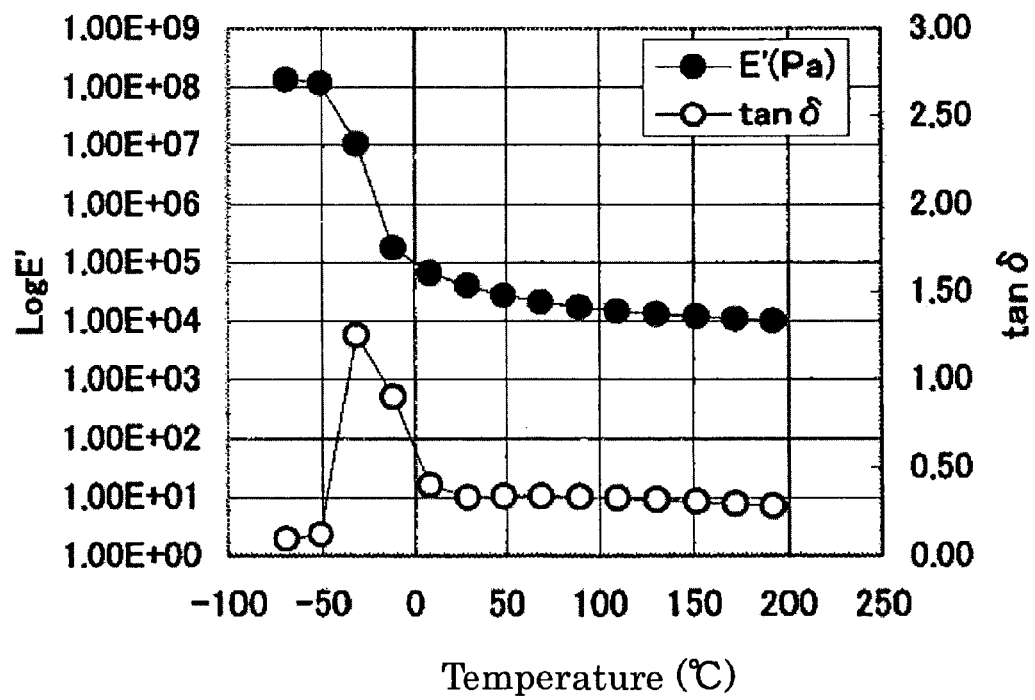
FIG. 2 is a graph showing the storage modulus (E') and the loss tangent (tan δ) of an adhesive layer 3 derived from an adhesive (1) used in Example 1.
Figure 3:
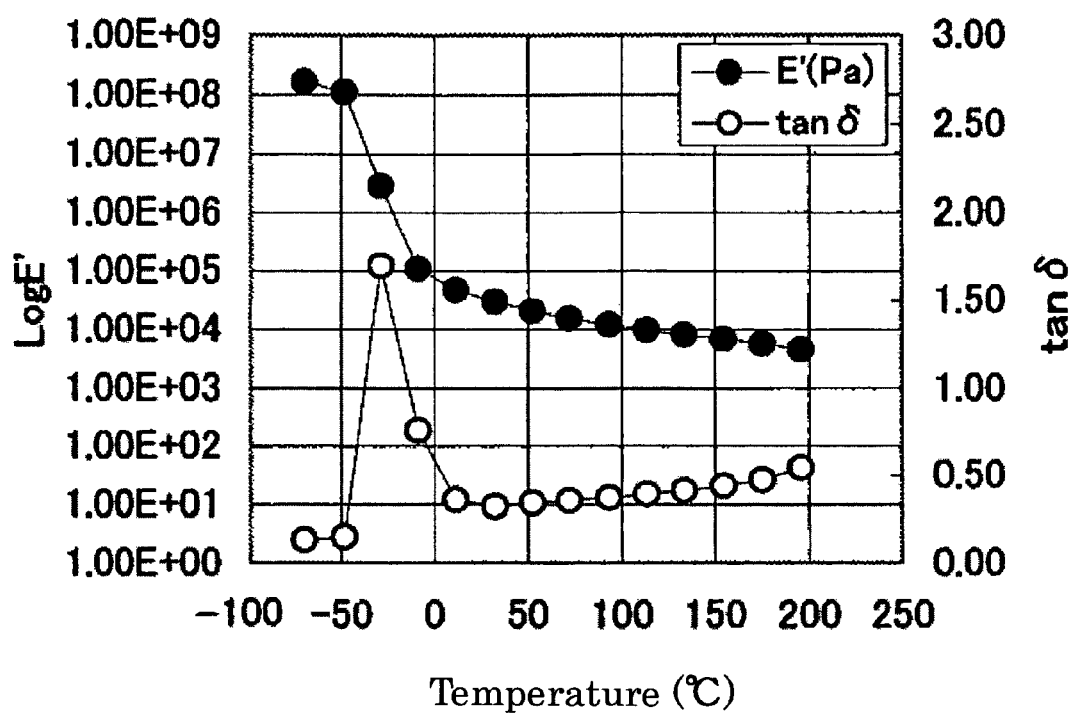
FIG. 3 is a graph showing the storage modulus (E') and the loss tangent (tan δ) of an adhesive layer 5 derived from an adhesive (2) used in Example 1.

| Description of remarks |
| --- |
| 1: anti-reflection film |
| 2: polarizing film |
| 3: adhesive layer |
| 4: liquid crystal cell |
| 5: adhesive layer |
| 6: polarizing film |
| 7: brightness enhancement film |
| 8: optical laminate |

DETAILED DESCRIPTION OF THE INVENTION

The present invention will be illustrated in detail below.

The optical laminate of the present invention is a laminate obtained by sequentially laminating an anti-reflection film 1, polarizing film 2, adhesive layer 3, glass cell for liquid crystal display 4, adhesive layer 5 and polarizing film 6.

The adhesive layer 3 and the adhesive layer 5 are usually an adhesive layer formed by hardening an adhesive obtained by compounding a cross-linking agent in an acrylic resin and/or acrylic resin composition.

The acrylic resin used in such adhesive layers is preferably an acrylic resin containing a structural unit derived from an alkyl (meth)acrylate as a main component and a structural unit derived from (meth)acrylic acids having a polar functional group such as a hydroxyl group, amino group, free carboxyl group, heterocyclic group or the like (hereinafter, referred to as polar functional group-containing monomer in some cases).

(Meth)acrylates include alkyl acrylate such as methyl acrylate, ethyl acrylate, propyl acrylate, n-butyl acrylate, iso-butyl acrylate, 2-ethylhexyl acrylate, n-octyl acrylate, iso-octyl acrylate, lauryl acrylate, stearyl acrylate, cyclohexyl acrylate, isobornyl acrylate, benzyl acrylate, methoxyethyl acrylate, ethoxylmethyl acrylate and the like; and alkyl methacrylates such as methyl methacrylate, ethyl methacrylate, propyl methacrylate, n-butyl methacrylate, iso-butyl methacrylate, 2-ethylhexyl methacrylate, n-octyl methacrylate, iso-octyl methacrylate, lauryl methacrylate, stearyl methacrylate, cyclohexyl methacrylate, isobornyl methacrylate, benzyl methacrylate, methoxyethyl methacrylate, ethoxymethyl methacrylate and the like.

As the (meth)acrylates, (meth)acrylates containing an alicyclic structure in the molecule are illustrated.

The alicyclic structure is usually a cycloparaffin structure having 5 or more carbon atoms, preferably approximately 5 to 7 carbon atoms.

Examples of acrylates having alicyclic structure include isobornyl acrylate, cyclohexyl acrylate, dicyclopentanyl acrylate, cyclododecyl acrylate, methylcyclohexyl acrylate, trimethylcyclohexyl acrylate, tert-butylcyclohexyl acrylate, cyclohexyl-α-ethoxy acrylate, cyclohexyl phenyl acrylate and the like.

Examples of methacrylates having alicyclic structure include isobornyl methacrylate, cyclohexyl methacrylate, dicyclopentanyl methacrylate, cyclododecyl methacrylate, methylcyclohexyl methacrylate, trimethylcyclohexyl methacrylate, tert-butylcyclohexyl methacrylate, cyclohexyl-α-ethoxy methacrylate, cyclohexyl phenyl methacrylate and the like.

As the alkyl (meth)acrylate, a plurality of different alkyl (meth)acrylates may be used. The acrylic resin used in the adhesive layer contains a structural unit derived from an alkyl (meth)acrylate usually in an amount of 60 to 99.9 parts by weight, preferably 80 to 99.6 parts by weight.

Examples of the polar functional group-containing monomer include monomers having a free carboxyl group such as acrylic acid, methacrylic acid, β-carboxyethyl acrylate and the like; hydroxyl group-containing monomers such as 2-hydroxyethyl (meth)acrylate, 2-hydroxypropyl (meth)acrylate, chloro-2-hydroxypropyl (meth)acrylate, diethylene glycol mono(meth)acrylate and the like; monomers having a heterocyclic group such as acryloyl morpholine, vinylcaprolactam, N-vinyl-2-pyrrolidone, tetrahydrofurfuryl acrylate, tetrahydrofurfuryl methacrylate, caprolactone-modified tetrahydrofurfuryl acrylate, 3,4-epoxycyclohexyl methyl acrylate, 3,4-epoxycyclohexyl methyl methacrylate, glycidyl (meth)acrylate, 2,5-dihydrofuran and the like; monomers having an amino group different from heterocycles such as dimethylamino ethyl (meth)acrylate and the like.

As the polar functional group-containing monomer, a plurality of different polar functional group-containing monomers may be used. The acrylic resin used in the present invention contains a structural unit derived from a polar functional group-containing monomer in an amount of usually 0.1 to 20 parts by weight, preferably 0.4 to 10 parts by weight based on 100 parts by weight of the resin.

The acrylic resin used in the present invention may contain a structural unit derived from monomers other than alkyl (meth)acrylates and polar functional group-containing monomers, and examples thereof include structural units derived from styrene-based monomers, structural units derived from vinyl-based monomers, structural units derived from monomers having a plurality of (meth)acryloyl groups in the molecule.

Specific examples of the styrene-based monomer include alkylstyrenes such as styrene, methylstyrene, dimethylstyrene, trimethylstyrene, ethylstyrene, diethylstyrene, triethylstyrene, propylstyrene, butylstyrene, hexylstyrene, heptylstyrene, octylstyrene and the like; halogenated styrenes such as fluorostyrene, chlorostyrene, bromostyrene, dibromostyrene, iodostyrene and the like; further, nitrostyrene, acetylstyrene, methoxystyrene, divinylbenzene and the like.

Examples of the vinyl-based monomer include fatty vinyl esters such as vinyl acetate, vinyl propionate, vinyl butyrate, vinyl 2-ethylhexanoate, vinyl laurate and the like; halogenated vinyls such as vinyl chloride, vinyl bromide and the like; halogenated vinylidenes such as vinylidene chloride and the like; nitrogen-containing aromatic vinyls such as vinylpyridine, vinylpyrrolidone, vinylcarbazole and the like; conjugated diene monomers such as butadiene, isoprene, chloroprene and the like; divinylbenzene; acrylonitrile; methacrylonitrile and the like.

Examples of the monomer having a plurality of (meth)acryloyl groups in the molecule include monomers having two (meth)acryloyl groups in the molecule such as 1,4-butanediol di(meth)acrylate, 1,6-hexanediol (meth)diacrylate, 1,9-nonanediol di(meth)acrylate, ethylene glycol di(meth)acrylate, diethylene glycol di(meth)acrylate, tetraethylene glycol di(meth)acrylate, tripropylene glycol di(meth)acrylate and the like; monomers having three (meth)acryloyl groups in the molecule such as trimethylolpropane tri(meth)acrylate and the like.

The monomers other than alkyl (meth)acrylates and polar functional group-containing monomers may be used singly or in combination. The acrylic resin used in an adhesive layer contains a structural unit derived from monomers other than alkyl (meth)acrylates and polar functional group-containing monomers in an amount of usually 0 to 20 parts by weight, preferably 0 to 10 parts by weight based on 100 parts by weight of the resin.

The active ingredient of the adhesive layers 3 and 5 in the present invention may be an acrylic resin composition comprising two or more acrylic resins (2) containing a structural unit derived from an alkyl (meth)acrylate as a main component and a structural unit derived from a polar functional group-containing monomer. Further permissible may be an acrylic resin composition prepared by mixing the above-mentioned acrylic resin with an acrylic resin other than the above-mentioned acrylic resin, specifically, an acrylic resin containing a structural unit derived from an alkyl (meth)acrylate and containing no structural unit derived from a polar functional group-containing monomer, and the like.

In all acrylic resins constituting an adhesive, the weight ratio of the acrylic resin (2) containing a structural unit derived from an alkyl (meth)acrylate as a main component and a structural unit derived from a polar functional group-containing monomer is usually 60% or more, preferably 70% or more. When the weight ratio is 60% or more, there is a preferable tendency that the maximum value of the loss tangent of an adhesive described later can be easily controlled to a desired loss tangent maximum value.

The weight-average molecular weight based on polystyrene calibration standard of gel permeation chromatography (GPC) of the acrylic resin (2) containing a structural unit derived from an alkyl (meth)acrylate as a main component and a structural unit derived from a polar functional group-containing monomer is usually $1 \times 10^4$ to $150 \times 10^4$. When the weight-average molecular weight is $1 \times 10^4$ or more, there is a preferable tendency that adhesion under high temperature and high humidity increases thereby decreasing floating and peeling between a glass base plate and an adhesive layer, and re-workability is also improved, while when the weight-average molecular weight is $150 \times 10^4$ or less, there is a preferable tendency that even if the dimension of an optical film such as a polarizing film and the like changes, an adhesive layer varies following this dimension change, and a difference between the brilliance of peripheral portions and the brilliance of central portions of a glass cell for liquid crystal display disappears and light leakage and irregular color are thus suppressed.

When the acrylic resin is an acrylic resin composition comprising the acrylic resin (2) containing a structural unit derived from an alkyl (meth)acrylate as a main component and a structural unit derived from a polar functional group-containing monomer, and an acrylic resin (1) different from the acrylic resin (2), the weight-average molecular weight based on polystyrene calibration standard of gel permeation chromatography (GPC) of the acrylic resin (1) is usually 50,000 to 500,000. When the weight-average molecular weight is 50,000 or more, there is a preferable tendency that adhesion under high temperature and high humidity increases thereby decreasing floating and peeling between a glass base plate and an adhesive layer, and re-workability is also improved, while when the weight-average molecular weight is 500,000 or less, there is a preferable tendency that even if the dimension of an optical film changes, an adhesive layer varies following this dimension change, and a difference between the brilliance of peripheral portions and the brilliance of central portions of a liquid crystal cell disappears, and light leakage and irregular color are thus suppressed.

The acrylic resin (1) preferably has a molecular weight different from that of the acrylic resin (2) and may be an acrylic resin containing a structural unit derived from an alkyl (meth)acrylate as a main component and a structural unit derived from a polar functional group-containing monomer.

The weight-average molecular weight (Mw) based on polystyrene calibration standard of gel permeation chromatography (GPC) of the acrylic resin (2) is usually 1,000,000 to 1,500,000. When the weight-average molecular weight is 1,000,000 or more, there is a preferable tendency that adhesion under high temperature and high humidity increases thereby decreasing floating and peeling between a glass base plate and an adhesive layer, and re-workability is also improved, while when the weight-average molecular weight is 1,500,000 or less, there is a preferable tendency that even if the dimension of an optical film changes, an adhesive layer varies following this dimension change, and a difference between the brilliance of peripheral portions and the brilliance of central portions of a liquid crystal cell disappears, and light leakage and irregular color are thus suppressed.

Regarding the weight ratio (based on non-volatile components) of the acrylic resins (1) and (2), the amount of the acrylic resin (1) is usually 10 to 50 parts by weight, preferably about 20 to 40 parts by weight based on 100 parts by weight of the total amount of the acrylic resin (1) and the acrylic resin (2). When the amount of the acrylic resin (1) is 10 parts by weight or more, there is a preferable tendency that even if the dimension of an optical film changes, an adhesive layer varies following this dimension change, and a difference between the brilliance of peripheral portions and the brilliance of central portions of a liquid crystal cell disappears, and light leakage and irregular color are thus suppressed, while the amount of the acrylic resin (1) is 50 parts by weight or less, there is a preferable tendency that adhesion under high temperature and high humidity increases thereby decreasing floating and peeling between a glass base plate and an adhesive layer, and re-workability is also improved.

The viscosity of a solution (25° C.) prepared by diluting an acrylic resin or acrylic resin composition (hereinafter, referred to as acrylic resin (composition, in some cases)) contained in the adhesive layers 3 and 5 with ethyl acetate so that the non-volatile content thereof is 20% is usually 10 Pa·s or less, preferably 0.1 to 7 Pa·s. When the viscosity is 10 Pa·s or less, there is a preferable tendency that adhesion under high temperature and high humidity increases thereby decreasing floating and peeling between a glass base plate and an adhesive layer, and re-workability is also improved.

As the method of producing the acrylic resin used in the present invention, for example, a solution polymerization method, emulsion polymerization method, block polymerization method, suspension polymerization method and the like are listed.

In production of an acrylic resin, a polymerization initiator is usually used. The polymerization initiator is usually used in an amount of approximately 0.001 to 5 parts by weight based on 100 parts by weight of all monomers used in production of the acrylic resin.

As the polymerization initiator, for example, a heat-polymerization initiator, photo-polymerization initiator, and the like are listed.

Examples of the heat-polymerization initiator include azo-based compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaletonitrile), dimethyl-2,2'-azobis(2-methylpropionate), 2,2'-azobis(2-hydroxymethylpropionitrile) and the like; organic peroxides such as lauryl peroxide, tert-butyl hydroperoxide, benzoyl peroxide, tert-butyl peroxybenzoate, cumene hydroperoxide, diisopropyl peroxy dicarbonate, di-n-propyl peroxydicarbonate, tert-butyl peroxyneodecanoate, tert-butyl peroxypivalate, (3,5,5-trimethylhexanonyl) peroxide and the like; inorganic peroxides such as potassium persulfate, ammonium persulfate, hydrogen peroxide and the like.

Examples of the photo-polymerization initiator include 4-(2-hydroxyethoxy)phenyl(2-hydroxy-2-propyl)ketone and the like.

Redox-based initiators using a heat-polymerization initiator and a reducing agent together can also be used as a polymerization initiator.

As the method of producing an acrylic resin, a solution polymerization method is preferable.

Specifically mentioned as the solution polymerization method are a method in which given monomers and an organic solvent are mixed, a heat-polymerization initiator is added under a nitrogen atmosphere, and the mixture is stirred for approximately 3 to 10 hours at approximately 40 to 90° C., preferably approximately 60 to 80° C., and other methods. For controlling the reaction, a method in which monomers and a heat-polymerization initiator used are added during polymerization, a method in which these are dissolved in an organic solvent before addition thereof, and the like may be adopted.

Here, examples of the organic solvent include aromatic hydrocarbons such as toluene, xylene and the like; esters such as ethyl acetate, butyl acetate and the like; aliphatic alcohols such as n-propyl alcohol, isopropyl alcohol and the like; ketones such as methyl ethyl ketone, methyl isobutyl ketone and the like.

In the optical laminate of the present invention, the ratio (B/A) of the maximum value B of the loss tangent of the adhesive layer 5 to the maximum value A of the loss tangent of the adhesive layer 3 is required to be 1.1 or more, preferably 2 or more, more preferably 3 or more.

Here, the maximum value of loss tangent (tan δ) is the maximum value of loss modulus (E")/storage modulus (E'), each measured by heating the adhesive layer in a temperature range of −70° C. to 200° C. at a temperature rising rate of 4° C./min and a frequency of 1 Hz.

The maximum value A of the loss tangent of the adhesive layer 3 is usually 0.85 to 1.46, preferably 1.02 to 1.35, and the maximum value B of the loss tangent of the adhesive layer 5 is usually 1.30 to 1.85, preferably 1.35 to 1.74. It is preferable that the loss tangent of the adhesive layer 5 is larger than the loss tangent of the adhesive layer 3 by 0.05 or more, more preferably 0.2 or more, further preferably 0.3 or more.

When the maximum value A of the loss tangent of the adhesive layer 3 is 1.46 or less, there is a preferable tendency of suppressing floating and peeling because of the strong cohesion of the adhesive layer 3 irrespective of strong curl at a laminated part of an optical film composed of an anti-reflection film and a polarizing film, while when the maximum value A is 0.85 or more, there is a preferable tendency of higher storage stability as an adhesive.

For controlling the maximum value A of the loss tangent of the adhesive layer 3 in a range from 0.85 to 1.46, it may be advantageous to control the maximum value A of loss tangent by varying the amount of a cross-linking agent, specifically a cross-linking agent may be advantageously compounded in an amount of about 0.1 to 5 parts by weight based on 100 parts by weight of non-volatile components in an acrylic resin (composition), since when the amount of a cross-linking agent is increased, the maximum value A of loss tangent decreases, though varying depending on the kind of the acrylic resin (composition) as an active ingredient of the adhesive layer.

When the maximum value B of the loss tangent of the adhesive layer 5 is 1.85 or less, there is a preferable tendency that floating, foaming, peeling and the like do not occur easily, while when 1.30 or more, there is a preferable tendency that light leakage is suppressed.

For controlling the maximum value B of the loss tangent of the adhesive layer 5 in a range from 1.30 to 1.85, it may be advantageous to control the maximum value of loss tangent by varying the amount of a cross-linking agent, specifically a cross-linking agent may be advantageously compounded in an amount of about 0.01 to 2 parts by weight based on 100 parts by weight of non-volatile components in an acrylic resin (composition), since when the amount of a cross-linking agent is decreased, the loss tangent increases, though varying depending on the kind of the acrylic resin (composition) as a main component of the adhesive layer.

In the optical laminate of the present invention, (gel fraction of adhesive layer 3)/(gel fraction of adhesive layer 5) is preferably 1.1 or more, more preferably 1.5 or more, further preferably 2 or more.

Here, the gel fraction is measured according to the following (I) to (IV).

(I) An adhesive layer (thickness 25 μm) having an area of about 8 cm×about 8 cm and a metal mesh of SUS304 (SUS: stainless steel) mesh (about 10 cm×about 10 cm, weight (Wm)) are pasted.

(II) The weight (Ws) of the pasted article obtained in (I) is weighed, folded 4 times so as to wrap the adhesive layer and fastened, then, weighed (Wb).

(III) The mesh obtained in (II) is placed in a 125 ml glass vessel and immersed in 60 ml of ethyl acetate added, then, this glass vessel is stored for 3 days at room temperature.

(IV) The mesh is removed out from the glass vessel, dried at 120° C. for 24 hours, then, weighed (Wa), and the gel fraction is calculated based on the following formula.

$$\text{Gel fraction (wt \%)} = [\{Wa-(Wb-Ws)-Wm/(Ws-Wm)\} \times 100$$

The gel fraction of the adhesive layer 3 is usually 40 to 95%, preferably 50 to 80%, and the gel fraction of the adhesive layer 5 is usually 5 to 55%, preferably 15 to 50%. The gel fraction of the adhesive layer 3 is larger than the gel fraction of the adhesive layer 5 by preferably 5% or more, more preferably 10% or more, further preferably 30% or more.

When the gel fraction of the adhesive layer 3 is 40% or more, there is a preferable tendency of suppressing floating and peeling irrespective of strong curl at a laminated part of an optical film composed of an anti-reflection film and a polarizing film, while when 95% or less, there is a preferable tendency of higher storage stability as an adhesive.

For controlling the gel fraction of the adhesive layer 3 in a range from 40 to 95%, it may be advantageous to control the gel fraction by varying the amount of a cross-linking agent, specifically a cross-linking agent may be advantageously compounded in an amount of about 0.1 to 5 parts by weight based on 100 parts by weight of non-volatile components in an acrylic resin (composition), since when the amount of a cross-linking agent is increased, the gel fraction increases, though varying depending on the kind of the acrylic resin (composition) as an active ingredient of the adhesive layer.

When the gel fraction of the adhesive layer 5 is 5% or more, there is a preferable tendency that floating, foaming, peeling and the like do not occur easily, while when 50% or less, there is a preferable tendency that light leakage is suppressed.

For controlling the gel fraction of the adhesive layer 5 in a range from 5 to 50%, it may be advantageous to control the gel fraction by varying the amount of a cross-linking agent, specifically a cross-linking agent may be advantageously compounded in an amount of about 0.01 to 2 parts by weight based on 100 parts by weight of non-volatile components in an acrylic resin (composition), since when the amount of a cross-linking agent is decreased, the gel fraction decreases, though varying depending on the kind of the acrylic resin (composition) as a main component of the adhesive layer.

The cross-linking agent used in the adhesive of the present invention has in the molecule two or more functional groups capable of cross-linking with a polar functional group contained in the acrylic resin, and specific examples thereof include isocyanate-based compounds, epoxy-based compounds, metal chelate-based compounds, aziridine-based compounds and the like.

Here, examples of the isocyanate-based compound include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethylxylylene diisocyanate, naphthalene diisocyanate, triphenylmethane triisocyanate, polymethylene polyphenyl isocyanate and the like, and adducts obtained by reacting polyols such as glycerol, trimethylolpropane and the like with the above-mentioned isocyanate compounds, and those obtained by converting the isocyanate compounds into dimmers, trimers and the like, are also included.

The isocyanate-based compound may be used alone or admixture two or more.

Examples of the epoxy-based compound include bisphenol A type epoxy resin, ethylene glycol glycidyl ether, polyethylene glycol diglycidyl ether, glycerine diglycidyl ether, glycerine triglycidyl ether, 1,6-hexanediol diglycidyl ether, trimethylolpropane triglycidyl ether, diglycidylaniline, N,N,N',N'-tetraglycidyl-m-xylenediamine, 1,3-bis(N,N'-diglycidylaminomethyl)cyclohexane and the like.

The epoxy-based compound may be used alone or admixture two or more.

Examples of the metal chelate compound include compounds obtained by coordinating acetylacetone or ethyl acetoacetate on poly-valent metals such as aluminum, iron, copper, zinc, tin, titanium, nickel, antimony, magnesium, vanadium, chromium, zirconium and the like.

Examples of the aziridine-based compound include N,N'-diphenylmethane-4,4'-bis(1-aziridine carboxide), N,N'-toluene-2,4-bis(1-aziridine carboxamide), triethylenemelamine, bisisophthaloyl-1-(2-methylaziridine), tri-1-aziridinylphosphine oxide, N,N'-hexamethylene-1,6-bis(1-aziridine carboxide), trimethylolpropane-tri-β-aziridinyl propionate, tetramethylolmethane-tri-β-aziridinyl propionate, and the like.

The adhesive of the present invention is preferably compounded a silane-based compound before compounding the cross-linking agent.

Examples of the silane-based compound used in the adhesive of the present invention include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, phenyltrimethoxysilane, hexyltrimethoxysilane, hexamethylsilazane, decyltrimethoxysilane, diphenyldimethoxysilane, 1,3,5-tris(3-methoxysilylpropryl)isocyanurate, and the like. In the adhesive of the present invention, two or more silane-based compounds may be used.

The use amount of the silane-based compound (solution) is usually from approximately 0.0001 to 10 parts by weight, preferably from 0.01 to 5 parts by weight based on 100 parts by weight of an acrylic resin (composition) (non-volatile component). When the amount of a silane-based compound is 0.0001 part by weight or more, adhesion between an adhesive layer and a glass base plate is improved preferably. When the amount of a silane-based compound is 10 parts by weight or less, bleeding out of a silane-based compound from the adhesive layer tends to be suppressed preferably.

A cross-linking catalyst, weather-resistant stabilizer, tackifier, plasticizer, softening agent, dye, pigment, inorganic filler and the like may be further compounded to the adhesive of the present invention.

The optical laminate can be produced in comparatively short time by compounding a cross-linking catalyst together with a cross-linking agent to the adhesive. In the obtained optical laminate, floating and peeling between an optical film and an adhesive layer, and foaming in the adhesive layer tend to lower, further, a re-working property tends to be improved, preferably.

Examples of the cross-linking catalyst include amine-based compound such as hexamethylenediamine, ethylenediamine, polyethyleneimine, hexamethylenetetramine, diethylenetriamine, triethylenetetramine, isophoronediamine, triethylenediamine, polyamino resin, melamine resin, and the like. When using the amine-based compound as the cross-linking catalyst in the adhesive, the isocyanate-based compound is preferably used as the cross-linking agent.

The optical laminate of the present invention is a laminate obtained by sequentially laminating an anti-reflection film 1, polarizing film 2, adhesive layer 3, glass cell for liquid crystal display 4, adhesive layer 5 and polarizing film 6, and the production method thereof includes, for example, a method in which an adhesive layer 3 and an adhesive layer 5 wherein the ratio (B/A) of the maximum value B of the loss tangent of the adhesive layer 5 to the maximum value A of the loss tangent of the adhesive layer 3 is 1.1 or more, an adhesive layer 3 and an adhesive layer 5 wherein (gell fraction of adhesive layer 3)/(gel fraction of adhesive layer 5) is 1.1 or more, or an adhesive layer 3 and an adhesive layer 5 wherein the ratio (B/A) of the maximum value B of the loss tangent of the adhesive layer 5 to the maximum value A of the loss tangent of the adhesive layer 3 is 1.1 or more and (gel fraction of adhesive layer 3)/(gel fraction of adhesive layer 5) is 1.1 or more are prepared, and an anti-reflection film 1, polarizing film 2, adhesive layer 3, glass cell for liquid crystal display 4, adhesive layer 5 and polarizing film 6 are sequentially laminated, and other methods.

Specifically mentioned are;

a method in which an adhesive 3 diluted in an organic solvent is applied on a release film, heated at 60 to 120° C. for about 0.5 to 10 minutes thereby distilling off the organic solvent to obtain an adhesive layer 3, then, a polarizing film 2 is pasted on the adhesive layer, then, aged for about 5 to 20 days in the case of an atmosphere including a temperature of 23° C. and a humidity of 65% to attain a sufficient reaction of a cross-linking agent, then, the release film is striped to obtain a laminate of the adhesive layer 3 and a polarizing film 2, and in a like manner, a laminate of an adhesive layer 5 and a polarizing film 6 is manufactured and the adhesive layer 3 and the adhesive layer 5 are pasted on a glass base plate of a glass cell for liquid crystal display 4, then, a anti-reflection film 1 is pasted on the polarizing film 2;

a method in which two-layered laminates composed of a release film and an adhesive layer are obtained according to the above-mentioned method, these are combined in a multi-layered structure, then, aged for about 5 to 20 days in the case of an atmosphere including a temperature of 23° C. and a humidity of 65% to attain a sufficient reaction of a cross-linking agent, then, the release film is peeled, and a polarizing film is instead pasted to obtain a laminate composed of an adhesive layer and the polarizing film, thus the laminates of release film/adhesive layer 3/polarizing film 2 and release film/adhesive layer 5/polarizing film 6 are obtained, the release film is peeled, a glass cell for liquid crystal display 4 is pasted on the peeled surface, further, a anti-reflection film 1 is pasted on the polarizing film 2, to produce an optical laminate;

further, a method in which a anti-reflection film 1 and a polarizing film 2 previously laminated are used, and other methods.

Here, the release film is a base material used in forming an adhesive layer. It may also be a base material for protecting an adhesive layer from foreign materials such as dust and dirt during aging or in preserving in the form of a laminate of an adhesive layer and a polarizing film in some cases. Specifically, a film made of various resins such as polyethylene terephthalate, polybutylene terephthalate, polycarbonate, polyarylate and the like is used as a base material, and a release treatment (silicone treatment and the like) is performed on a connecting surface of this base material with an adhesive layer, to obtain a release film. Also other films are mentioned.

The polarizing films 2 and 6 are an optical film having a function of emitting polarization light against incident light such as natural light and the like. The polarizing film includes a straight line polarizing film having a nature of absorbing straight line polarization on a vibration surface parallel to an optical axis and allowing permeation of straight line polarization having a vibration surface as a vertical surface, a polarization separating film which reflects straight line polarization on a vibration surface parallel to an optical axis, an elliptic polarizing film having lamination of a polarizing film and a phase retardation film described later, and the like. Specifically, a dichroic coloring matter such as iodine, dichroic dye and the like is absorbed and oriented in a monoaxially stretched polyvinyl alcohol film and a base plate film is pasted on both surfaces of the resultant film, to obtain a polarizing film. Also other polarizing films are mentioned.

The base plate film includes films made of acrylic resins other than the acrylic resin of the present invention, acetylcellulose-based films such as a cellulose triacetate film and the like, polyester resin films, olefin resin films, polycarbonate resin films, polyether ether ketone resin films, polysulfone resin films and the like.

The base plate film may include an ultraviolet absorber compounded such as salicylate-based compounds, benzophenone-based compounds, benzotriazole-based compounds, triazine-based compounds, cyano acrylate-based compounds, nickel complex salt-based compounds and the like.

Of the base plate films, acetylcellulose-based films are suitable.

The polarizing films 2 and 6 are usually pasted to an adhesive layer so that respective vibration surfaces of emission light mutually cross.

The anti-reflection film 1 is an optical film for lowering reflection of a beam emitted from an outer light source such as a fluorescent lamp and the like to enhance visibility of a liquid crystal display. Specifically, an anti-glare (AG) film having irregularity on its surface to scatter reflection light, an anti-reflection (AR) film preventing reflection utilizing light interference, a low reflection (LR) film, and the like are mentioned. A hard coat layer or the like may also be laminated on the surface of the anti-reflection film.

Though a laminate of an anti-reflection film 1 and a polarizing film 2 tends to manifest curl and consequently easily generate floating and peeling of an adhesive layer 3, the optical laminate of the present invention is capable of reducing floating and peeling even if a laminate of an anti-reflection film 1 and a polarizing film 2 is used.

On the optical laminate of the present invention, optical films such as, for example, phase retardation films, base plate films (Protective Film), brightness enhancement films and the like may be further laminated in addition to the anti-reflection film and polarizing film.

The phase retardation film is an optical film having monoaxial or bi-axial optical anisotropy, and listed are stretched films obtained by stretching at approximately 1.01 to 6-fold a polymer film composed of polyvinyl alcohol, polycarbonate, polyester, polyallylate, polyimide, polyolefin, polystyrene, polysulfone, polyether sulfone, polyvinylidene fluoride/polymethyl methacryalte, liquid crystal polyester, acetylcellulose, cyclic polyolefin, ethylene-vinyl acetate copolymer saponified material, polyvinyl chloride and the like. Among them, polymer films obtained by mono-axial or bi-axial stretching of polycarbonate or polyvinyl alcohol are preferably used.

Examples of the phase retardation film include a monoaxial phase retardation film, wide viewing angle phase retardation film, low photo-elastic phase retardation film, temperature-compensated phase retardation film, LC film (rod-like liquid crystal twisted orientation), WV film (disc-like liquid crystal inclined orientation), NH film (rod-like liquid crystal inclined orientation), VAC film (complete bi-axial orientation type phase retardation film), new VAC film (biaxial orientation type phase retardation film) and the like.

The phase retardation film is usually pasted between an adhesive layer and a polarizing film.

The brightness enhancement film is an optical film capable of enhancing utilization efficiency of back light in a liquid crystal display. Examples thereof include a reflection polarization type film "DBEF", an upward prism sheet "DEF", a downward prism sheet "DIAART", "Transmax" prepared by laminating three layers of a light wavelength range cholestric liquid crystal film, phase difference compensating film and ¼ wavelength phase retardation film, and the like.

The brightness enhancement film is usually pasted on a surface of a polarizing film 6 different from the surface which is pasted to an adhesive layer 5.

The glass cell for liquid crystal display contains a glass base material, and usually, that having a liquid crystal compound between glass base plates is used in a liquid crystal display.

Liquid crystal display mode of the glass cell for liquid crystal display includes TN, STN, IPS (In-Plane Switching), VA (Vertical Alignment), OCB (Optically Compensated Birefringence) and the like.

Examples of materials of the glass base material include soda lime glass, low alkali glass, no-alkali glass and the like.

Further, even after peeling a polarizing film from an optical laminate of the present invention, it is easy to re-paste the polarizing film again to the peeled glass cell for liquid crystal display since fogging, paste remaining and the like scarcely occur on the surface of a glass base material in contact with an adhesive layer. That is, so-called reworkabiliy is excellent.

In the optical laminate of the present invention, stress in an anti-reflection film 1, polarizing film 2 and a glass cell for liquid crystal display 4 ascribable to dimension change of a glass base plate under wet heat conditions is suppressed by high cohesion of an adhesive layer 3, to prevent floating and peeling of the adhesive layer 3 from the glass base plate. Since stress in a polarizing film 6 and a glass cell for liquid crystal display 4 ascribable to dimension change of a glass base plate is remarkably absorbed and relaxed, local stress concentration is reduced and floating and peeling of an adhesive layer 5 from the glass base plate are suppressed, simultaneously, optical defects ascribable to ununiform stress distribution are prevented. By this, light leakage is suppressed in the case of a glass base plate made of a TN liquid crystal cell (TFT) and irregular color is suppressed in the case of a glass base plate made of a STN liquid crystal cell.

The optical laminate of the present invention has excellent durability that changes in appearances such as light leakage, floating, peeling, foaming, fogging and the like are not caused even if heating and cooling is repeated, and even in the case of an optical laminate for 15 inch or more large size, light leakage and irregular color are suppressed.

Further, even if a polarizing film 2 and/or a polarizing film 6 is, together with an adhesive layer 3 and/or adhesive layer 5, peeled from a glass base plate of a glass cell for liquid crystal display 4, it can be used again as the glass cell for liquid crystal display 4 since fogging and paste remaining on the surface of the glass base plate after peeling are suppressed. That is, re-workability is excellent.

The optical laminate of the present invention is suitably used for, for instance, optical laminates such as a TN liquid crystal cell (TFT) and the like. When the optical laminate of the present invention is used for a STN liquid crystal cell, irregular color in the resulting optical laminate can be suppressed.

The present invention is suitably used in a liquid crystal display because of excellent durability and light leakage-prevention even in larger scale.

The liquid crystal display of the present invention contains an optical laminate of the present invention, and examples thereof include liquid crystal displays for personal computers such as note type computers, desk top type computers, PDAs (Personal Digital Assistance) and the like, liquid crystal displays for liquid crystal televisions, displays for vehicle mounting, electronic dictionaries, digital cameras, digital video cameras, electronic calculators, clocks and the like.

EXAMPLES

The following description will explain the present invention in more detail, referring to examples. It is needless to say, however, that the present invention is not limited by the examples.

"parts" and "%" in the examples are by weight unless otherwise stated.

The non-volatile content was measured according to JIS K-5407. Specifically, any aliquot of an adhesive solution was weighed and placed in a schale and dried at 115° C. for 2 hours in an explosion-proof oven, then, the remaining non-volatile components were weighed and represented in a proportion to the weight of the originally weighed solution.

The viscosity is a value measured by a Brook Field viscometer at 25° C.

The weight-average molecular weight was measured using an apparatus including, as a column, two TSKgel G6000HXLs and two TSKgel G5000HXLs, each manufactured by Tosoh Corp., sequentially connected in series, using tetrahydrofuran as an eluant under conditions of a temperature of 40° C. and a flow rate of 1 ml/min, at a sample concentration of 5 mg/ml and a sample introduction amount of 100 μml, based on polystyrene calibration standard.

<Production Examples of Acrylic Resin>

Polymerization Example 1

A reaction vessel equipped with a cooling tube, nitrogen introduction tube, thermometer and stirrer was charged 222 parts of ethyl acetate, air in the apparatus was purged with a nitrogen gas, then, the inner temperature was raised to 75° C. A solution prepared by dissolving 0.55 parts of azobisisobutyronitrile (hereinafter, referred to as AIBN) in 12.5 parts of ethyl acetate was added in its entirety, then, a mixed solution of 36 parts of butyl acrylate, 44 parts of butyl methacrylate and 20 parts of methyl acrylate as a monomer (a) was dropped into the reaction system over a period of 3 hours while maintaining the inner temperature at 69 to 71° C. Thereafter, the inner temperature was kept at 69 to 71° C. for 5 hours, to complete the reaction. The weight-average molecular weight based on polystyrene calibration standard of GPC was 100,000, and Tg was −13° C. The results are shown in Table 1.

Polymerization Example 2

A reaction vessel equipped with a cooling tube, nitrogen introduction tube, thermometer and stirrer was charged 100 parts of ethyl acetate, 98.9 parts of butyl acrylate as a monomer (a) and 1.1 parts of acrylic acid as a polar functional group-containing monomer, air in the apparatus was purged with a nitrogen gas, and the inner temperature was raised to 70° C. while maintaining no oxygen-containing atmosphere, then, a solution prepared by dissolving 0.03 parts of azobisisobutyronitrile (hereinafter, referred to as AIBN) in 10 parts of ethyl acetate was added in its entirety. Thereafter, the inner temperature was kept at 69 to 71° C. for 12 hours, to complete the reaction. The weight-average molecular weight based on polystyrene calibration standard of GPC was 1,200,000, and Mw/Mn was 3.9.

Example 1

<Production Example of Adhesive>

Acrylic resins (1) and (2) were mixed in a weight ratio shown in Table 1, to obtain an ethyl acetate solution of an acrylic resin composition. 100 parts of solid components in the resulting solution were mixed with 0.07 parts (solid content) of a cross-linking agent, polyisocyanate-based compound (trade name: Takenate D-110 N, manufactured by Mitsui Takeda Chemical) and 0.1 part (solid content) of a silane compound (trade name: Y11597, manufactured by Nippon Unicar), to obtain an adhesive (1) of the present invention. In the same manner, an adhesive (2) was prepared. The mixing ratio of the acrylic resins (1) and (2), cross-linking agent, silane-based compound and loss tangent are shown in Table 1.

tially. This optical laminate was obtained in the form of rectangle of 30 cm×22 cm (15 inch) or larger.

<Measurement of Maximum Value of Loss Tangent>

The maximum value of the loss tangent of an adhesive layer was measured according to the following (I) to (IV).

(I) Each 25±1 mg of two samples are taken from an adhesive layer, and these are molded into approximate balls.

(II) The sample obtained in (I) is adhered on upper and lower surfaces of an I type jig, and both of the upper and lower surfaces are sandwiched with L type jigs. The constitution of a measuring sample is L type-adhesive-I type-adhesive-L type jig.

(III) The measuring sample manufactured was applied to a dynamic viscoelasticity measurement apparatus (DVA-220, manufactured by IT Keisoku Seigyo K.K.) and the storage modulus (E') and the loss modulus (E") thereof were measured in a temperature range from −70° C. to 200° C. at a temperature rising rate of 4° C./min and a frequency of 1 Hz, and the loss tangent E"/E' (=tan δ) was obtained at each temperature.

TABLE 1

| | acrylic resin (1) | | acrylic resin (2) | | cross-linking agent (isocyanate compound) | | silane-based compound | | | storage | |
|---|---|---|---|---|---|---|---|---|---|---|---|
| | polymerization example | non-volatile content (parts) | polymerization example | non-volatile content (parts) | kind | use amount (parts) | kind | use amount (parts) | peak temperature * | at peak temperature | maximum value loss tangent ** |
| adhesive (1) | 1 | 30 | 2 | 70 | D-110N | 1 | Y11597 | 0.1 | −32° C. | 1.1 × 10³ Pa | 1.25 |
| adhesive (2) | 1 | 30 | 2 | 70 | D-110N | 0.07 | Y11597 | 0.1 | −32° C. | 2.9 × 10⁶ Pa | 1.70 |

* peak temperature: temperature giving maximum value of loss tangent
** maximum value of loss tangent: loss tangent at peak temperature
D-160N: Takenate D-160N manufactured by Mitsui Takeda Chemical <Production Example of Optical Laminate>

Thus obtained adhesive (2) was applied on the surface of a polyethylene terephthalate film (manufactured by Lintech, trade name: PET3811) which had been release-treated using an applicator so that the thickness after drying was 25 μm, dried at 90° C. for 1 minute, to obtain an adhesive in the form of sheet. Then, a polarizing film (three-layered film obtained by sandwiching a film prepared by allowing polyvinyl alcohol to adsorb iodine and stretching this with triacetylcellulose-based protective films situated on both surfaces of the polyvinyl alcohol film) was used, and a surface having the adhesive obtained above was pasted on the resultant polarizing film by a laminator, then, aged for 10 days under conditions of a temperature of 23° C. and a humidity of 65%, to form a laminated part of an adhesive layer 5 and a polarizing film 6. A polarizing film 2 to which an anti-reflection film 1 had been pasted was aged in the same manner so that an adhesive layer 3 was formed on the surface of the polarizing film using the adhesive (1), to form a laminated part of anti-reflection film 1/polarizing film 2/adhesive layer 3. Subsequently, the adhesive surfaces of the adhesive layers 3 and 5 and both surfaces of a glass cell for liquid crystal display (manufactured by Corning, 1737) were pasted. In this operation, the polarizing films 2 and 6 were pasted so as to form cross Nicol, obtaining an optical laminate containing anti-reflection film 1/polarizing film 2/adhesive layer 3/glass base plate 4/adhesive layer 5/polarizing film 6 laminated sequen- (IV) The maximum value of loss tangent at temperatures from −70° C. to 200° C. was measured as the maximum value of loss tangent in the present invention.

In this example, since loss tangent (=tan δ) can be measured by an inner numerical value treating program of the above-mentioned dynamic viscoelasticity measuring apparatus, its maximum value was read.

(Evaluation)

In a case of storing an optical laminate at 80° C. under dry condition for 96 hours (condition 1), a case of storing an optical laminate at 60° C. and 90% RH for 96 hours (condition 2), and a case including one cycle (1 hour) of heating up to 60° C., cooling down to −20° C. and further heating up to 60° C., and in which this cycle is repeated 100 times (condition 3), durability of an optical laminate after storage was observed visually, and under the condition 1, manifestation condition of light leakage was visually observed. The results are classified according to the following standards and shown in Table 1.

<Light Leaking Property of Optical Laminate>

The manifestation condition of light leakage was evaluated according to the following four stages.

⊚: utterly no light leakage
○: almost no remarkable light leakage
Δ: slightly remarkable light leakage
X: remarkably recognizable light leakage <Durability of Optical Laminate>

The durability was evaluated according to the following four stages.

⊚: utterly no changes in appearances such as floating, peeling, foaming and the like ○: almost no changes in appearances such as floating, peeling, foaming and the like Δ: slightly remarkable changes in appearances such as floating, peeling, foaming and the like X: remarkably recognizable changes in appearances such as floating, peeling, foaming and the like <Re-Workability>

The re-workability was evaluated as described below. First, the above-mentioned optical laminate was processed into specimens of 25 mm×150 mm. Then, this specimen was adhered on a glass base plate for liquid crystal cell using an adhering apparatus (manufactured by Fuji Plastic Machine K.K., "Lamipacker"), and subjected to an autoclave treatment at 50° C. and 5 kg/cm² (490.3 kPa) for 20 minutes. Subsequently, a heating treatment at 70° C. was conducted for 2 hours, the specimen was stored in an oven of 50° C. for 48 hours, then, this adhering specimen was peeled toward 180° direction at a rate of 300 mm/min in a RH atmosphere of a temperature of 23° C. and a relative humidity of 50%, and the conditions of the surface of the glass plate classified according to the following standards were observed. The results are shown in Table 1.

○: almost no fogging observed on the surface of a glass plate

Δ: fogging observed on the surface of a glass plate

X: paste remaining observed on the surface of a glass plate

Comparative Example 1 to 2

Optical laminates were obtained using the adhesives described in Table 2 according to Example 1. Evaluation of the resultant optical laminate was carried out in the same manner as in Example 1, and results are shown in Table 2 together with the results in Example 1.

is 0.85 to 1.46 and the maximum value B of the loss tangent of the adhesive layer 5 is 1.30 to 1.85.

3. The optical laminate according to claim 1, wherein (gel fraction of adhesive layer 3)/(gel fraction of adhesive layer 5) is 1.1 or more.

4. The optical laminate according to claim 1, wherein the gel fraction of the adhesive layer 3 is 40 to 95% and the gel fraction of the adhesive layer 5 is 5 to 55%.

5. The optical laminate according to claim 1, wherein the adhesive layer 3 and the adhesive layer 5 are an adhesive layer formed by hardening an adhesive obtained by compounding a cross-linking agent in an acrylic resin and/or acrylic resin composition.

6. The optical laminate according to claim 5, wherein the cross-linking agent is an isocyanate-based compound.

7. The optical laminate according to claim 1, wherein the adhesive used in the adhesive layer 3 and the adhesive layer 5 is an adhesive comprising an acrylic resin containing a structural unit derived from an alkyl (meth)acrylate as a main component and a structural unit derived from (meth)acrylic acids having a polar functional group.

8. The optical laminate according to claim 7, wherein the polar functional group is at least one functional group selected from the group consisting of a hydroxyl group, amino group, free carboxyl group and heterocyclic group.

9. The optical laminate according to claim 1, wherein the adhesive used in the adhesive layer 3 and the adhesive layer 5 is an adhesive containing the following acrylic resins (1) and (2);

Acrylic resin (1): acrylic resin containing a structural unit derived from an alkyl (meth)acrylate as a main component and having a weight-average molecular weight of 50,000 to 500,000, Acrylic resin (2): acrylic resin containing a structural unit derived from an alkyl (meth)acrylate as a main component and a structural unit derived from (meth)acrylic acids having a polar functional group such as a hydroxyl group, amino group, free carboxyl group, heterocyclic

TABLE 2

| | adhesive layer 3 | adhesive layer 5 | ratio of maximum | condition 1 | | condition 2 | condition 3 | |
|---|---|---|---|---|---|---|---|---|
| | kind of adhesive (A) | kind of adhesive (B) | value of loss tangent (B/A) | durability | light leakage | durability | durability | re-workability |
| Example 1 | adhesive (1) | adhesive (2) | 3.7 | ⊚ | ⊚ | ⊚ | ⊚ | ○ |
| Comparative Example 1 | adhesive (1) | adhesive (1) | 1.0 | X | ⊚ | Δ | X | ○ |
| Comparative Example 2 | adhesive (2) | adhesive (2) | 1.0 | ⊚ | X | ⊚ | ⊚ | ○ |

What is claimed is:

1. An optical laminate comprising an anti-reflection film 1, polarizing film 2, adhesive layer 3, glass cell for liquid crystal display 4, adhesive layer 5 and polarizing film 6, laminated sequentially surface to surface, wherein the ratio (B/A) of the maximum value B of the loss tangent of the adhesive layer 5 to the maximum value A of the loss tangent of the adhesive layer 3 is 1.1 or more. and wherein the maximum value of the loss tangent means the maximum value of loss modulus (E")/ storage modulus (E')(=tan δ), each measured by heating the adhesive layer in a temperature range of −70° C. to 200° C. at a temperature rising rate of 4° C./min and a frequency of 1 Hz.

2. The optical laminate according to claim 1, wherein the maximum value A of the loss tangent of the adhesive layer 3 group or the like, and having a weight-average molecular weight of 1,000,000 to 1,500,000.

10. The optical laminate according to claim 1, wherein the adhesive used in the adhesive layer 3 and the adhesive layer 5 is an adhesive further containing a silane-based compound.

11. The optical laminate according to claim 1, further containing at least one phase retardation film.

12. The optical laminate according to claim 1, wherein a luminance improving film 7 is further laminated on a surface of the polarizing film 6 which is different from the surface pasted on the adhesive layer 5.

13. A liquid crystal display comprising the optical laminate according to claim 1.

14. A method for producing an optical laminate, comprising sequentially laminating surface to surface, an anti-reflection film 1, polarizing film 2, adhesive layer 3, glass cell for liquid crystal display 4, adhesive layer 5 and polarizing film 6, wherein the ratio (B/A) of the maximum value B of the loss tangent of the adhesive layer 5 to the maximum value A of the loss tangent of the adhesive layer 3 is 1.1 or more, and wherein the maximum value of the loss tangent means the maximum value of loss modulus (E")/storage modulus (E') (=tan δ), each measured by heating the adhesive layer in a temperature range of −70 °C. to 200 °C. at a temperature rising rate of 4 °C./min and a frequency of 1 Hz.

15. The production method according to claim 14, wherein (gel fraction of adhesive layer 3)/(gel fraction of adhesive layer 5) is 1.1 or more.

* * * * *